(12) United States Patent
Baldwin et al.

(10) Patent No.: US 11,760,052 B2
(45) Date of Patent: Sep. 19, 2023

(54) DRAINAGE HOUSEWRAP

(71) Applicant: Specialty Coating & Laminating, LLC, Doswell, VA (US)

(72) Inventors: Geoffrey M. Baldwin, Mechanicsville, VA (US); Robert C. Anderson, Beaverdam, VA (US)

(73) Assignee: Specialty Coating & Laminating, LLC, Doswell, VA (US)

( * ) Notice: Subject to any disclaimer, the term of this patent is extended or adjusted under 35 U.S.C. 154(b) by 0 days.

(21) Appl. No.: 17/712,688

(22) Filed: Apr. 4, 2022

(65) Prior Publication Data
US 2022/0227093 A1    Jul. 21, 2022

Related U.S. Application Data

(63) Continuation of application No. 16/705,975, filed on Dec. 6, 2019, now abandoned.

(51) Int. Cl.
*B32B 3/26* (2006.01)
*B32B 5/02* (2006.01)
(Continued)

(52) U.S. Cl.
CPC .............. *B32B 3/263* (2013.01); *B32B 5/022* (2013.01); *B32B 7/14* (2013.01); *B32B 27/12* (2013.01);
(Continued)

(58) Field of Classification Search
CPC .. B32B 3/26; B32B 5/02; B32B 27/18; B32B 27/32; B32B 7/14; B32B 27/12
(Continued)

(56) References Cited

U.S. PATENT DOCUMENTS

| | | | |
|---|---|---|---|
| 2005/0097861 A1* | 5/2005 | Schroer ................. | E04H 9/145 52/782.1 |
| 2013/0101805 A1* | 4/2013 | Altshuler ............... | B32B 3/266 264/109 |

(Continued)

OTHER PUBLICATIONS

First Office Action from USPTO dated Aug. 17, 2020; U.S. Appl. No. 16/705,975; 8 pages.
(Continued)

*Primary Examiner* — Tahseen Khan
(74) *Attorney, Agent, or Firm* — Goodman Allen Donnelly PLLC; Anthony Tacconi, Esq.

(57) ABSTRACT

A housewrap is a multi-layer drainage wrap. A nonwoven base web has a three-dimensional pattern embossed therein on one surface of the web. This embossed web is then extrusion coated with a polymer coating. The coating is extrusion-coated on to embossed side of the nonwoven base web. The nonwoven base web has the three-dimensionally embossed and coated side as its outward facing surface. The coated base web is then activated by stretching to provide moisture vapor permeance at a rate that allows a building to breathe. The result is a housewrap that is textured on both the inside and outside faces of the housewrap. The texture and weather resistive coating on exterior side facilitates both drainage of water off of the outside face of the housewrap and the circulation of air and moisture around and through the inside face of the housewrap and promotes a tighter seal and better adhesion to flashing tapes reducing further the points of entry for water into the structure.

9 Claims, 14 Drawing Sheets

(51) Int. Cl.
 *B32B 27/18* (2006.01)
 *B32B 27/12* (2006.01)
 *B32B 7/14* (2006.01)
 *B32B 27/32* (2006.01)

(52) U.S. Cl.
 CPC .............. *B32B 27/18* (2013.01); *B32B 27/32* (2013.01); *B32B 2264/10* (2013.01); *B32B 2419/00* (2013.01)

(58) Field of Classification Search
 USPC ....................................................... 428/172
 See application file for complete search history.

(56) References Cited

U.S. PATENT DOCUMENTS

| | | | | |
|---|---|---|---|---|
| 2013/0295364 A1* | 11/2013 | Saavedra | ................ | C08K 3/26 524/427 |
| 2016/0160436 A1* | 6/2016 | Lyons | .................... | B82Y 30/00 442/62 |
| 2018/0245332 A1* | 8/2018 | Widenbrant | ............ | B32B 27/08 |

OTHER PUBLICATIONS

Second Office Action from USPTO dated Jun. 1, 2021; U.S. Appl. No. 16/705,975; 10 pages.

Third Office Action from USPTO dated Nov. 19, 2021; U.S. Appl. No. 16/705,975; 10 pages.

\* cited by examiner

DRAINAGE HOUSEWRAP

This application is a continuation application of U.S. patent application Ser. No. 16/705,975 filed on Dec. 6, 2019, which is incorporated by reference herein in its entirety.

The present invention is directed to a multi-layer housewrap that prevents liquid water from passing through into a house, yet the housewrap is still breathable to allow water vapor to pass through it. Further, the housewrap has a textured surface in the form of channels which allow water on the surface of the housewrap to drain down by gravity.

BACKGROUND

Many conventional housewraps are simply flat sheets of barrier material. With these wraps, a potential problem may develop in that water can build up between the outside of the wrap and the inside of the siding of the house. There can be nowhere for the water to drain, because it can be blocked by the siding pressing against the housewrap. As a result, sometimes, the water may flow sideways to a window or door and cause water damage there. Therefore, even though a conventional flat housewrap may possibly be an effective water barrier, ancillary problems may arise.

Some housewraps have been developed that have bumps molded on or embossed in the housewrap substrate. The bumps define channels therebetween that can allow water drainage downwardly behind the siding. In some cases, the bumps themselves are porous materials that allow water to gather in the material. If a significant amount of water builds up in the bumps themselves, then again, other possible moisture problems may arise between the housewrap barrier and a siding. It is also more difficult for flashing tapes to adhere and provide a tight seal as the surface that the flashing is sealed to is a porous mat below the tape. This area can provide an entry point for water to breach the flashing tape by wicking in underneath the tape.

SUMMARY

Accordingly, it is an object of the present invention to overcome the drawbacks in existing housewrap products by providing a drainage and breathable housewrap.

In one example, a drainage housewrap comprises a nonwoven base web having a three-dimensional pattern pressed therein to form channels on a surface of the base web, and a coating bonded by extrusion coating to the surface of the base web after the three-dimensional pattern is pressed in it. The coating comprises a mixture of a polymer and calcium carbonate particles, and the coated base web is activated by mechanical stretching of the coated base web in order to create micropores in the coating on the base web. The three-dimensional pattern pressed into the base web may create two sets of channels that are substantially perpendicular from each other. The polymer portion of the coating may comprise polyethylene or polypropylene. The three-dimensional pattern may be in the shape of oval half-bubbles. The oval half-bubbles may be positioned in alternating rows such that a long axis of each row of oval half-bubbles is perpendicular to the long axis of each adjacent row of oval half-bubbles. The calcium carbonate may comprise 35-70% by weight of the coating.

DETAILED DESCRIPTION

The housewrap described herein is a multi-layer drainage wrap. A nonwoven base web has a three-dimensional pattern embossed therein on one surface of the web. The nonwoven base web has the three-dimensionally embossed and coated side as its outward facing surface. The coating is extrusion-coated on to the embossed side of the nonwoven base web. The coating is then activated by stretching after the coating and cooling of the coating on the base web. The result is a housewrap that is textured on both the inside and outside faces of the housewrap. The texture facilitates both drainage of water off of the outside face of the housewrap and the circulation of air and moisture around and through the inside face of the housewrap.

Each component will be discussed separately herein. There can be additional components that may be added depending on the application and intended environment where the housewrap is used.

The nonwoven base web is a substrate of nonwoven spunbonded polymer fibers. The fibers that may be used include polyethylene, polypropylene, polyester, nylon, polyvinyl chloride, bicomponent fibers and mixtures of two or more of the foregoing. In one example of the present web, the base web has a weight of 80-120 g/m2, or 90-110 g/m2, or 95-105 g/m2, or in one example, about 100 g/m2. The thickness of the base web before further processing is 0.0025-0.030 inches, or 0.003-0.020 inches, or still further 0.005-0.012 inches. This thickness is the lofted thickness of the nonwoven web before any embossing of a pattern on or extruding any coating thereon.

Next, the nonwoven base has a bubble pattern embossed therein by passing the nonwoven base through heated nip rollers. The surface of one of the rollers is flat while the second opposing roller has a textured pattern to create half-bubbles on the surface of the embossed nonwoven base. The resulting pattern is essentially in the form of half-bubbles. The half-bubbles may be round or oval or square or triangular or any other shape, whether symmetric or asymmetric. In one example, the half-bubbles are embossed in rows. The half-bubbles may be oval-shaped with the long axis of the oval at about 45 degrees to the perpendicular of the wrap when installed on a building. The alternating rows of half-bubbles may be 45 degrees in the opposite direction such that the adjacent bubbles on neighboring rows are 90 degrees offset from each other. The rows of half-bubbles may be matching rows in that there are equal numbers of half-bubbles that are spaced out equally in neighboring rows. In this format, channels are created perpendicular to each other so that regardless of how the housewrap is installed, there is a vertical drainage channel created.

The embossed web has a thickness of about 0.0015 to 0.060 inches, in one example about 0.008 inches, where compressed between the half-bubbles. The full height/thickness of the web with the half-bubbles is about 0.015 to 0.05 inches, in one example 0.032 inches at its maximum thickness of the web. The area size of the half-bubbles is variable. The length may be about 0.1 to 4.0 inches, in one example 0.65 inches with the width being about 0.1 to 0.5 inches, in one example 0.35 inches in the oval example. For a multi directional installation there needs to be gaps/channels between the raised areas allowing for water to flow downward by gravity through the gaps. For a mono directional installation, the raised areas can be the full height of the web (in a striping pattern). Also, the embossed pattern half-bubbles may be oriented in direction in multiple ways that encourage or direct water drainage down the face of the housewrap once installed. When taking into account the entire surface area of the housewrap, the raised, embossed area comprises from about 25% to 75%, in one example about 50% of the entire surface area of the housewrap.

Next, the embossed, nonwoven base web has a coating applied to it by extrusion coating. The molten coating material is applied by nip roller to the base web and then quenched to bond the coating onto the web. The heated coating material allows the intertwining of the molten material into the nonwoven web. Importantly, this means that no adhesive is required to attach the coating layer onto the nonwoven base web. Therefore, there is no concern about future degradation of an adhesive. The coating is applied onto the embossed face of the web. This is the side of the web that will be installed facing outwardly from a house.

The coating is a mixture of polymer and inorganic particles such as calcium carbonate. The polymer portion of the coating is typically polyethylene or polypropylene, but it could include other polymers as well. If polyethylene, then the density of the polyethylene is 0.915-0.925, or alternatively, 0.918-0.923 grams per cubic centimeter (g/cm3). If polypropylene, then the density is 0.89-0.92 g/cm3, or alternatively, 0.90-0.91 g/cm3. The calcium carbonate is 35-70% by weight of the coating mixture, or alternatively 40-60% by weight. Additional additives in the coating mixture include pigment, UV inhibitors, and processing aids. Importantly, there is no adhesive fraction in the coating mixture. The coating weight of the mixture on the base web is 30-45 g/m2, or alternatively, 35-40 g/m2.

The coated nonwoven web is next activated by stretching in order to create micropores across and through the coating layer. The coated web may be activated by stretching with or without heat added to the coated web. The stretch may be in the machine direction or cross direction or a combination of both directions. In one example, intermeshing gears are used to stretch the web in the cross-direction in non-uniform fashion. This may result in the stretching in the cross-direction of about 10% or less, or alternatively about 5% or less, or still further alternatively about 3% or less. The result is a breathable sheet that is substantially impermeable to liquid water yet permeable to gas/air that flows through the pores around the calcium carbonate in the polymer layer.

An important aspect of the entire web being coated on the outside-facing side of the web is the seal of the web to flashing that is taped to the web around windows and doors and other building openings. The flashing tape adhesive is able to form a continuous and complete seal with the coated surface of the housewrap. This seal prevents any wicking or other access of water underneath or around the flashing tape. The flashing tape is not adhered to any porous layer or component of the housewrap web as in other housewrap constructions. Also, the housewrap is pliant and resilient in that a flashing tape may be pressed onto the coated face of the housewrap, and the texture of the housewrap is able to be compressed to obtain the complete seal. Other housewraps with hard plastic beads applied to the surface of a housewrap are not resilient, so flashing tape applied to such other housewraps may unintentionally result in small gaps and crevices around the hard plastic beads that may enable water or moisture to leak underneath a flashing tape.

Another result of the foregoing processing is a housewrap that has a degree of texture on both sides of the housewrap. In other words, the oval half-bubbles on the coated side also extend outwardly from the opposite, uncoated side of the web. These back-side protrusions are not coated, but they may assist in creating the gaps or channels when the housewrap is installed behind a house siding.

Figure 1:
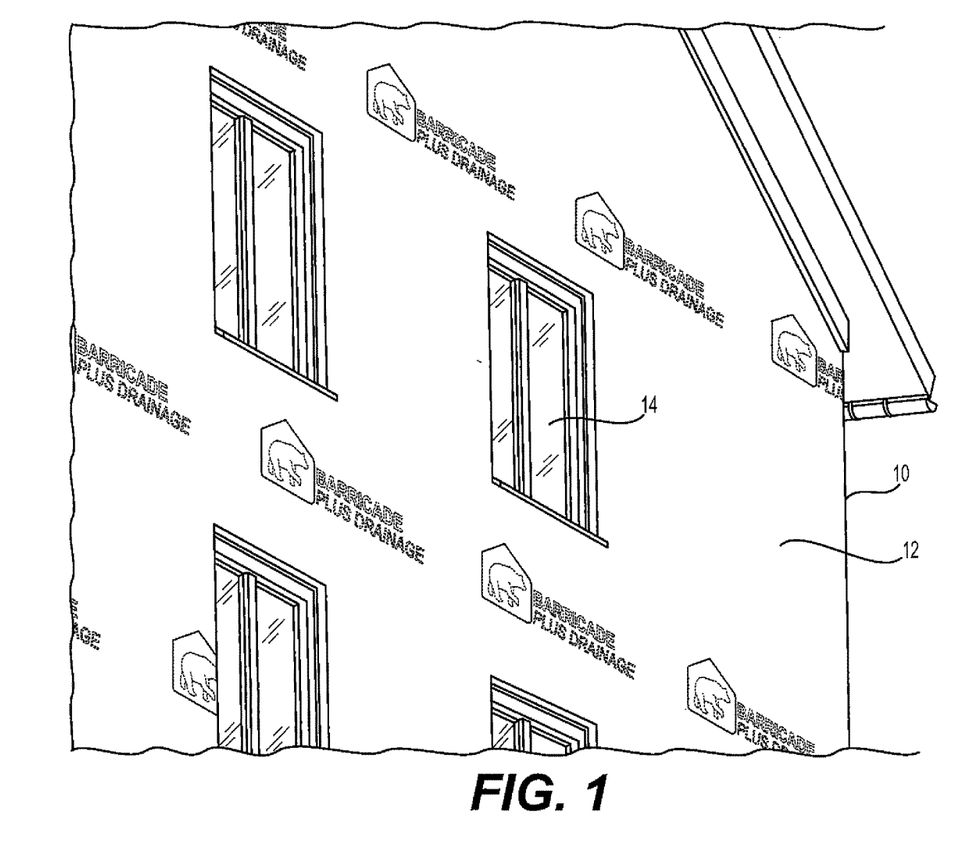
FIG. 1 is a perspective view of a portion of the side of a house with housewrap mounted thereon.

Turning now to the drawings, FIG. 1 shows the side of a portion of a house 10 having the housewrap 12 mounted on the walls and around the windows 14 of the house. FIG. 1 is a view of a house 10 during its construction. The housewrap 12 is a barrier film that is wrapped around the house and under siding (not shown) that is mounted over the housewrap. The housewrap 12 is typically a vertical installation, relative to the ground, on the side of a house 10, although there may be additional surfaces that are angled with respect to the ground not in the vertical orientation.

Figure 1A:
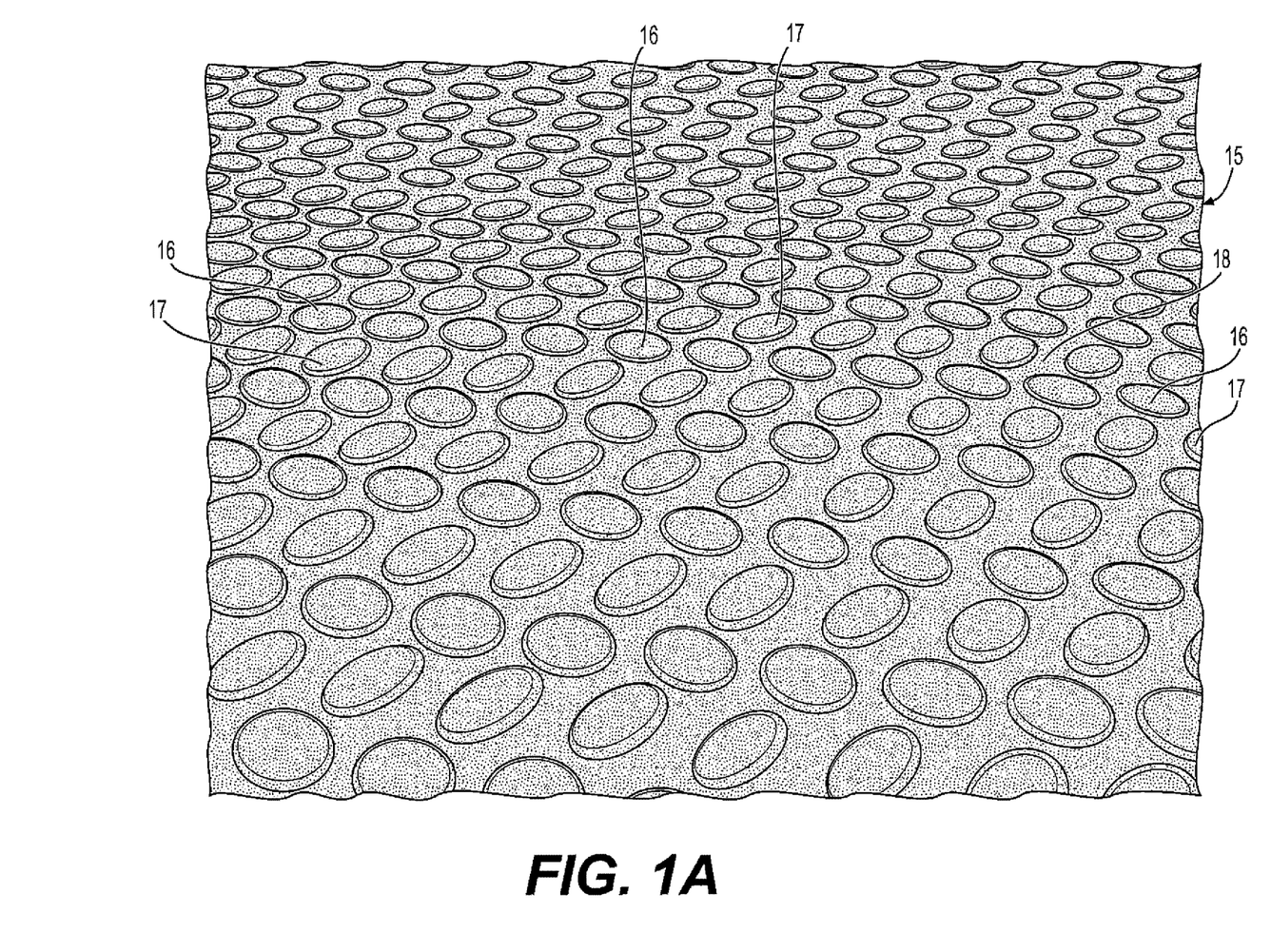
FIG. 1A is a perspective view of an example of the coated, outside face of a housewrap as described herein.

FIG. 1A is a close-up perspective view of a housewrap 15 similar to the housewrap 12 seen in its installed environment in FIG. 1. FIG. 1A illustrates the coated, outside of the house facing side of housewrap 15. The housewrap 15 has oval half-bubbles 16 and 17 embossed therein. In between the oval half-bubbles 16 and 17 is the compressed portion or channels 18 of the nonwoven housewrap 15. The embossing pattern in FIG. 1A is similar to that illustrated in FIG. 2A described below. There are alternating rows of oval half-bubbles 16 that are oriented on their long axis 90 degrees from the long axis of the oval half-bubbles 17 in the next adjacent row. In one example, it is intended that these oval half-bubbles 16 and 17 are oriented about 45 degrees from vertical in a vertical installation of the housewrap.

Figure 1B:
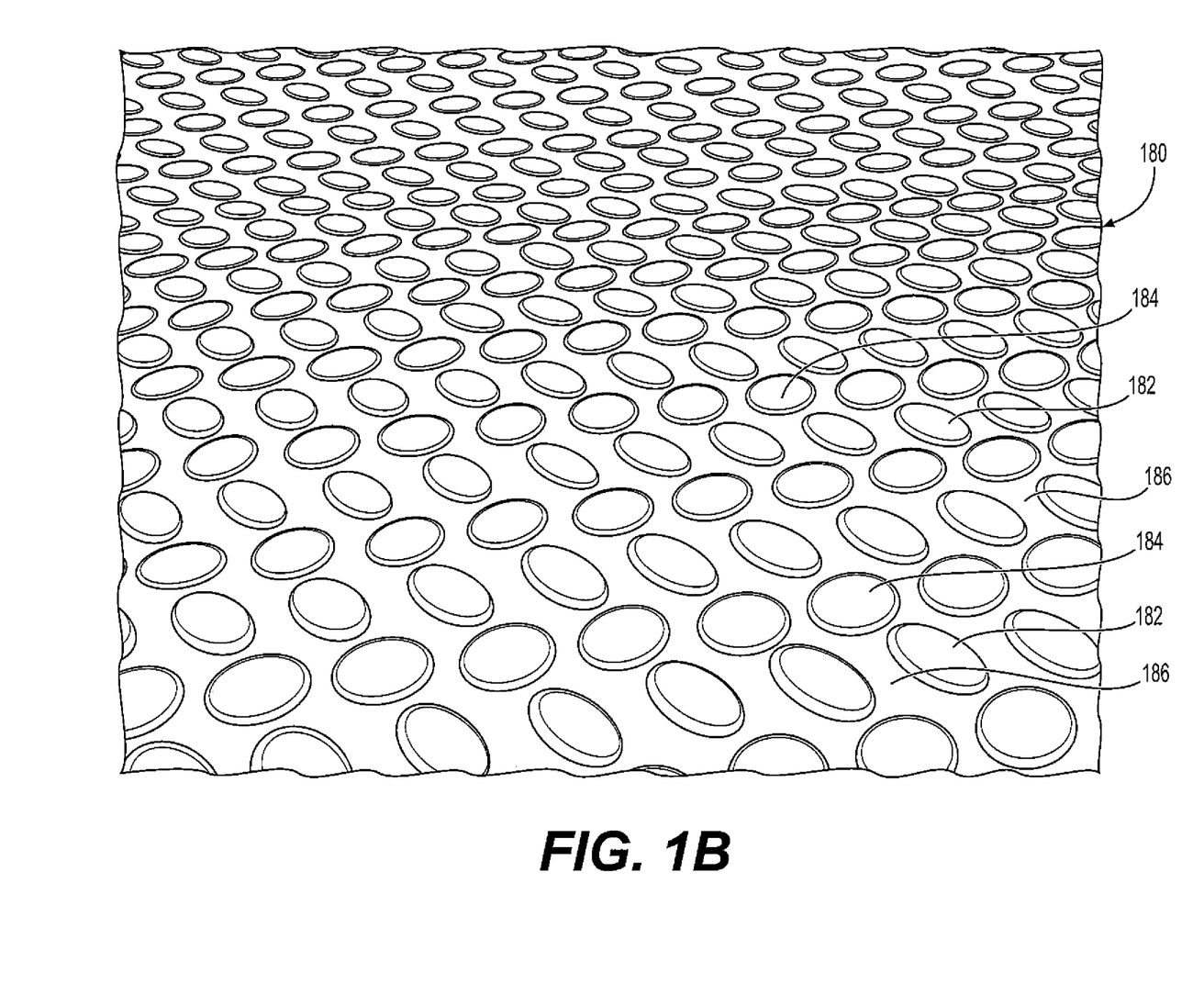
FIG. 1B is a perspective view of an example of the uncoated, inside face of a housewrap as described herein.

FIG. 1B is a close-up perspective view of a housewrap 180 similar to the housewrap 12 seen in its installed environment in FIG. 1. FIG. 1B illustrates the uncoated, inside of the house facing side of housewrap 180. This inside face of housewrap 180 is opposite the embossed side seen in FIG. 1A. This housewrap 180 has a flat inside the house facing side when it is embossed but not yet coated and activated. However, as is readily seen in FIG. 1B, the inside face of housewrap 180 does display some texture. The housewrap 180 inside face shown has oval half-bubble shapes 182 and 184 like on its outside face. There remains the flat portion 186 that is a series of channels between the raised half-bubbles 182 and 184. There is shown alternating rows of the half-bubble ovals 182 and 184 where half-bubble ovals 182 are oriented on their long axis perpendicular or 90 degrees from the long axis of oval half-bubbles 184 in the next adjacent rows. As with FIG. 1A, it is intended that these oval half-bubbles 182 and 184 are oriented about 45 degrees from vertical in a vertical installation of the housewrap.

Figure 1C:
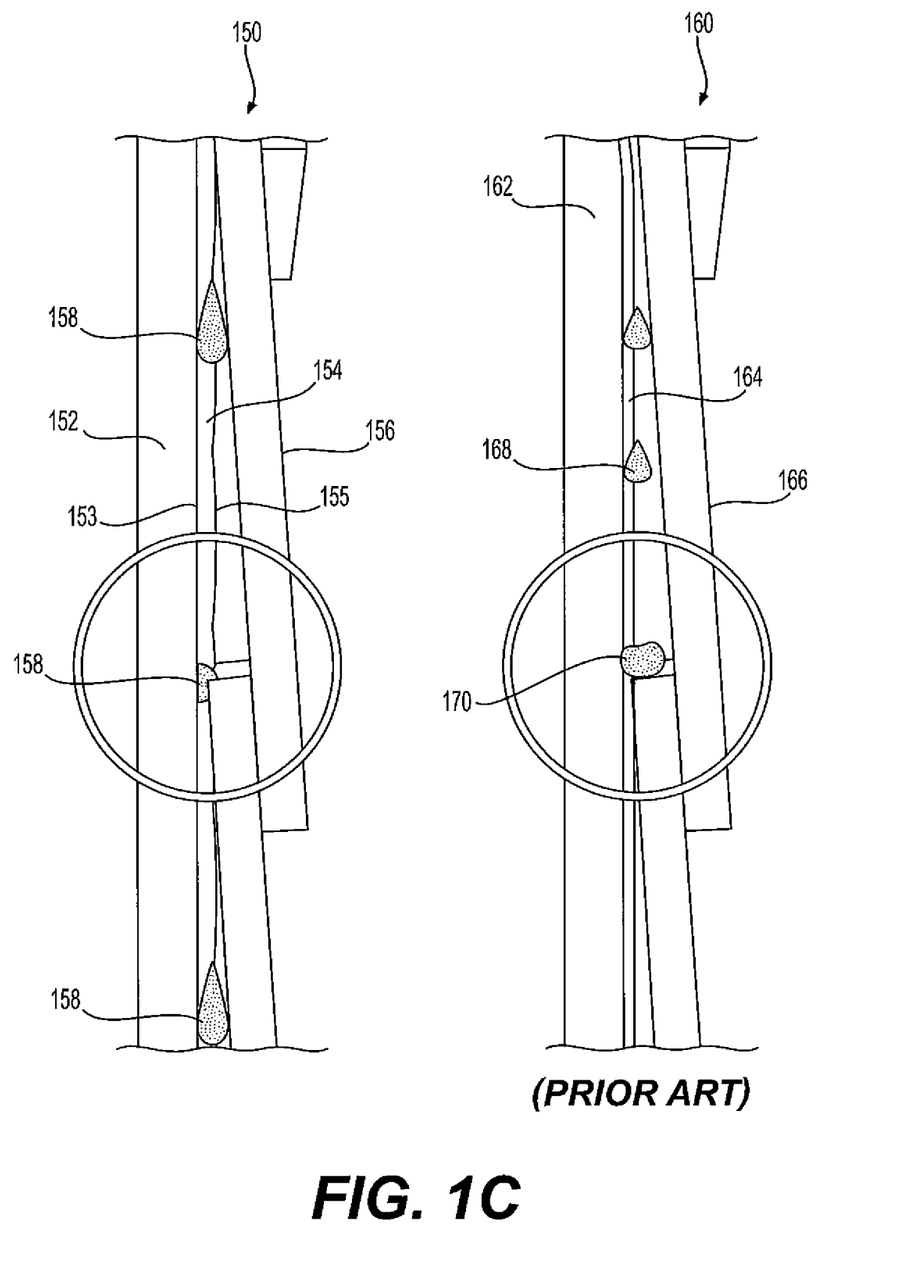
FIG. 1C is a pair of side views of a prior art housewrap and housewrap as described herein when mounted between a house structural board and house siding.

FIG. 1C illustrates the side cross-sectional views of two installations 150 and 160 of the housewrap 154 as described herein as compared with a prior art flat housewrap 164. In installation 160, a vertical structural board 162 has a flat housewrap 164 attached in its outside face. Siding boards 166 are then overlapped and secured to the structural board 162 so that the housewrap 164 is secured in between. During use, the installation 160 may have water 168 that builds up between the housewrap 164 and the siding 166. The water 168 flows downwardly by gravity and may dam 170 between the top of a siding board 166 and the housewrap 164. This trapped water 170 may flow sideways and damage windows and doors. The standing water 170 may simply damage the installation 160 generally. On the other hand, installation 150 has the housewrap 154 described herein installed between a structural board 152 and the siding panel 156. The outside face 155 of the housewrap 154 has texture on it as illustrated in FIG. 1A. In the installation 150, therefore, water 158 that may seep or form behind the siding 156 is allowed to flow downwardly by gravity in the channels between the textured half-bubbles.

Figure 2A:
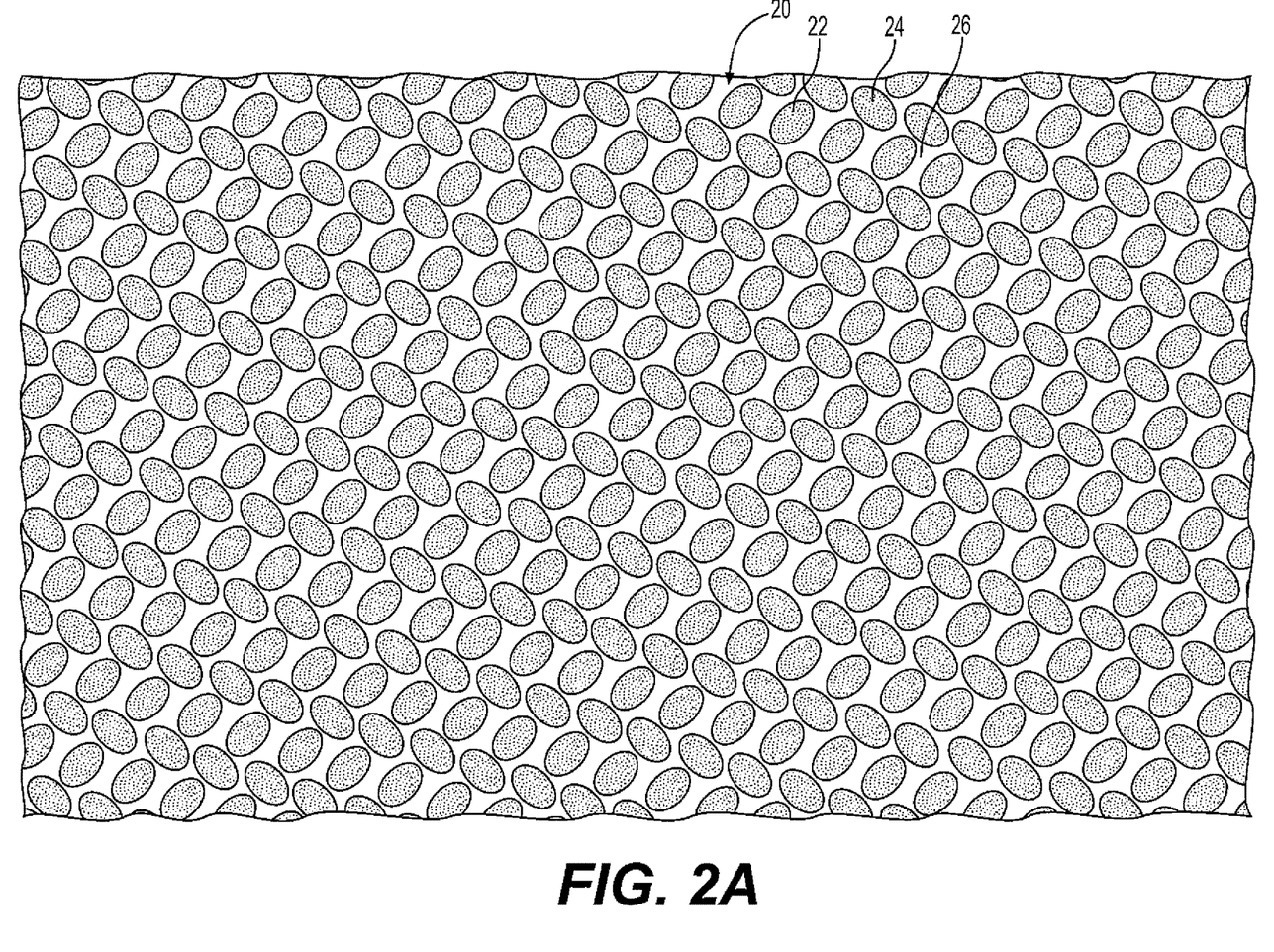
FIGS. 2A-2E are top views of portions of housewrap as described herein illustrating different patterns and orientation of patterns embossed in the housewrap.

FIG. 2A illustrates a top view of the outside face of a portion of housewrap 20 having oval shaped half-bubbles 22 and 24 embossed thereon. The unembossed, flat portion channels 26 of the housewrap 20 are between the half-bubbles 22 and 24. In FIG. 2A, looking from upper left to lower right, there are two rows, at about a 45 degree angle, of the oval half-bubbles 22 and 24. The long axes of the oval half-bubbles 22 and 24 are oriented perpendicular with respect to each other. Looking from upper right to lower left, those rows of half-bubbles are rows of alternating perpendicular ovals 22 and 24. The oval half-bubbles create channels in the flat surface 26 between the half-bubbles. Because of the three-dimensional structure of the oval half-bubbles 22 and 24, those channels are maintained even after siding is attached over the housewrap 20 in installation onto a house. This specific orientation also allows for an installer to mount the housewrap 20 in either direction on a wall thereby eliminating inadvertent error during installation.

Figure 2B:
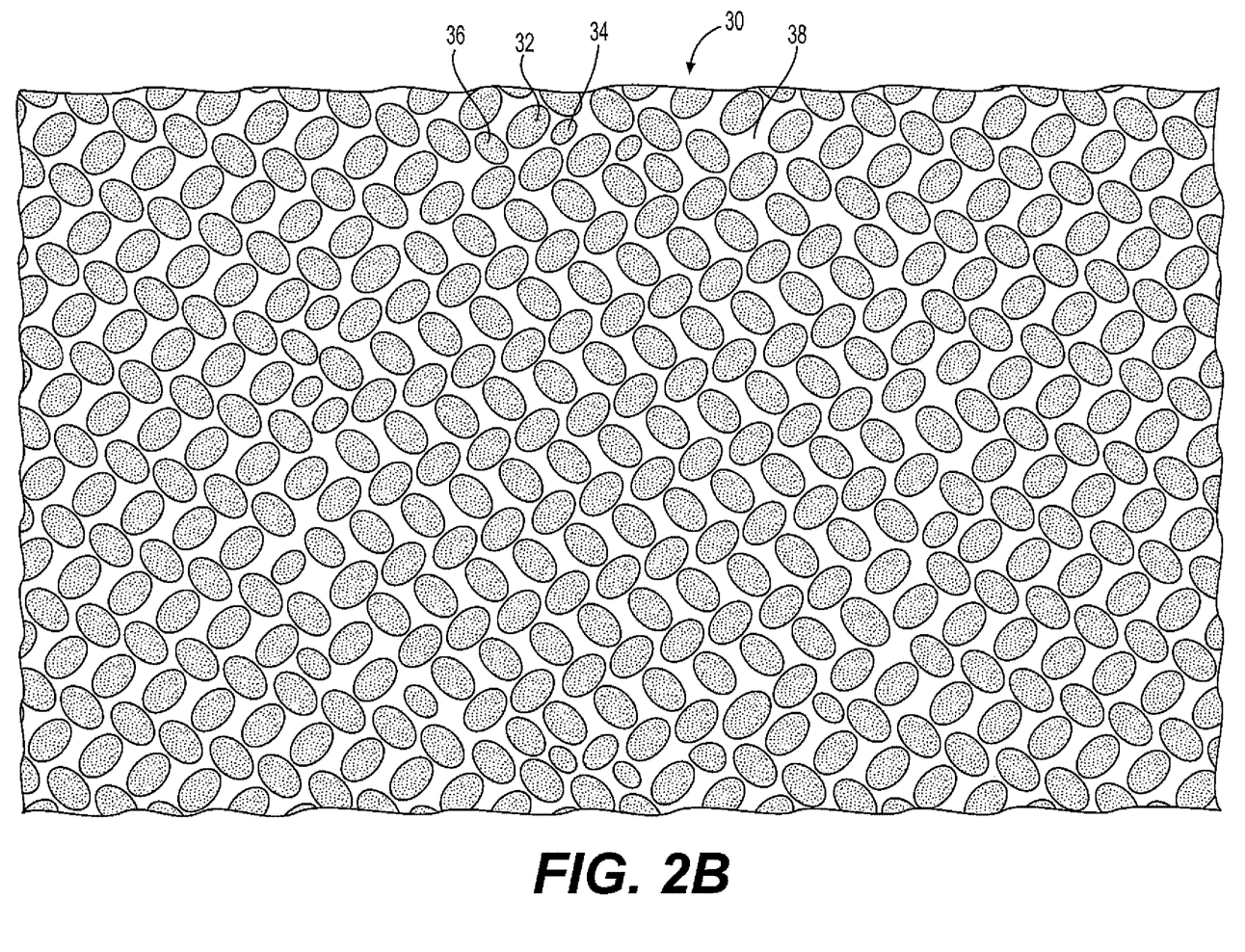

FIG. 2B is a top view of the outside face of an alternative housewrap 30 in which the flat portion channels 38 are configured between multiple size oval half-bubbles 32, 34 and 36. In this example, the oval half-bubbles 32, 34 and 36 are all generally oriented in their respective long axes on 45 degree angles.

Figure 2C:
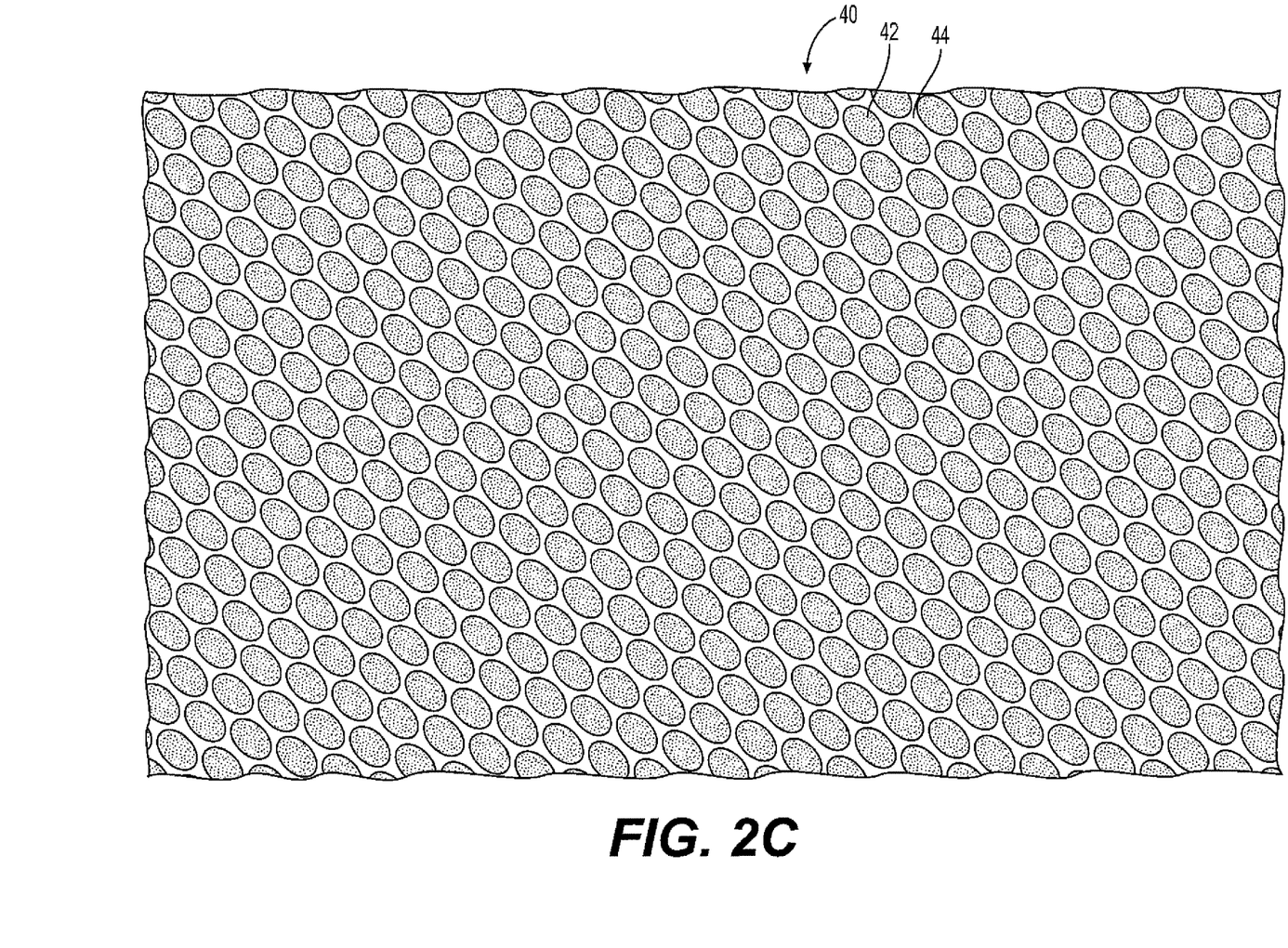

FIG. 2C illustrates the outside face of a housewrap 40 having uniform oval half-bubbles 42 creating channels 44 in the flat portion of the housewrap.

Figure 2D:
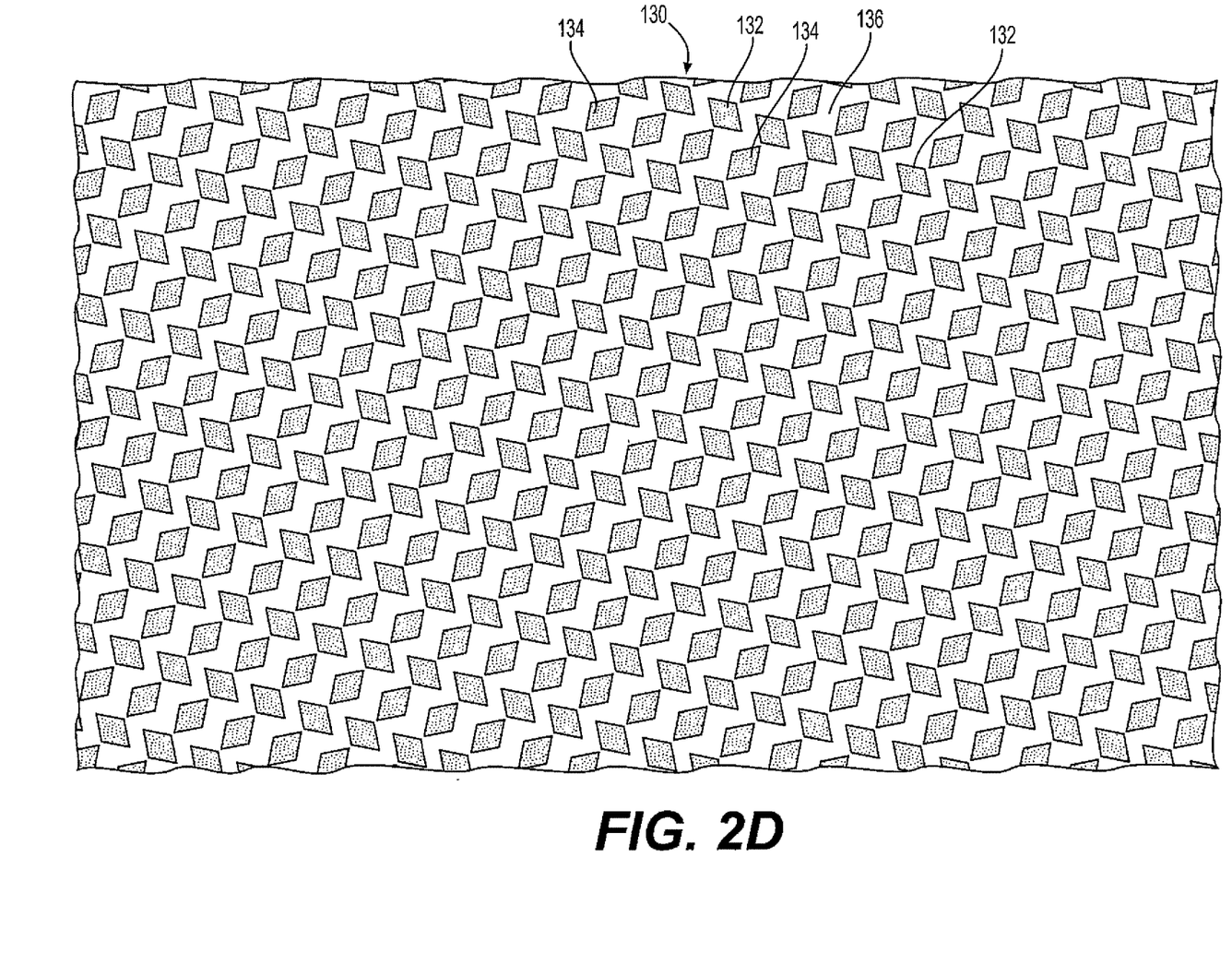

FIG. 2D is a top view of the outside face of a still further housewrap 130 having diamond-shaped half-bubbles 132 and 134 embossed thereon. In between the half-bubbles 132 and 134 are the flat portion channels 136. As shown, there are alternating rows of diamond half-bubbles 132 and 134 in a substantially symmetrical layout with the long axis of each diamond half-bubble 132 and 134 in adjacent perpendicular aspects with respect to each other and approximately 45 degrees from the vertical.

Figure 2E:
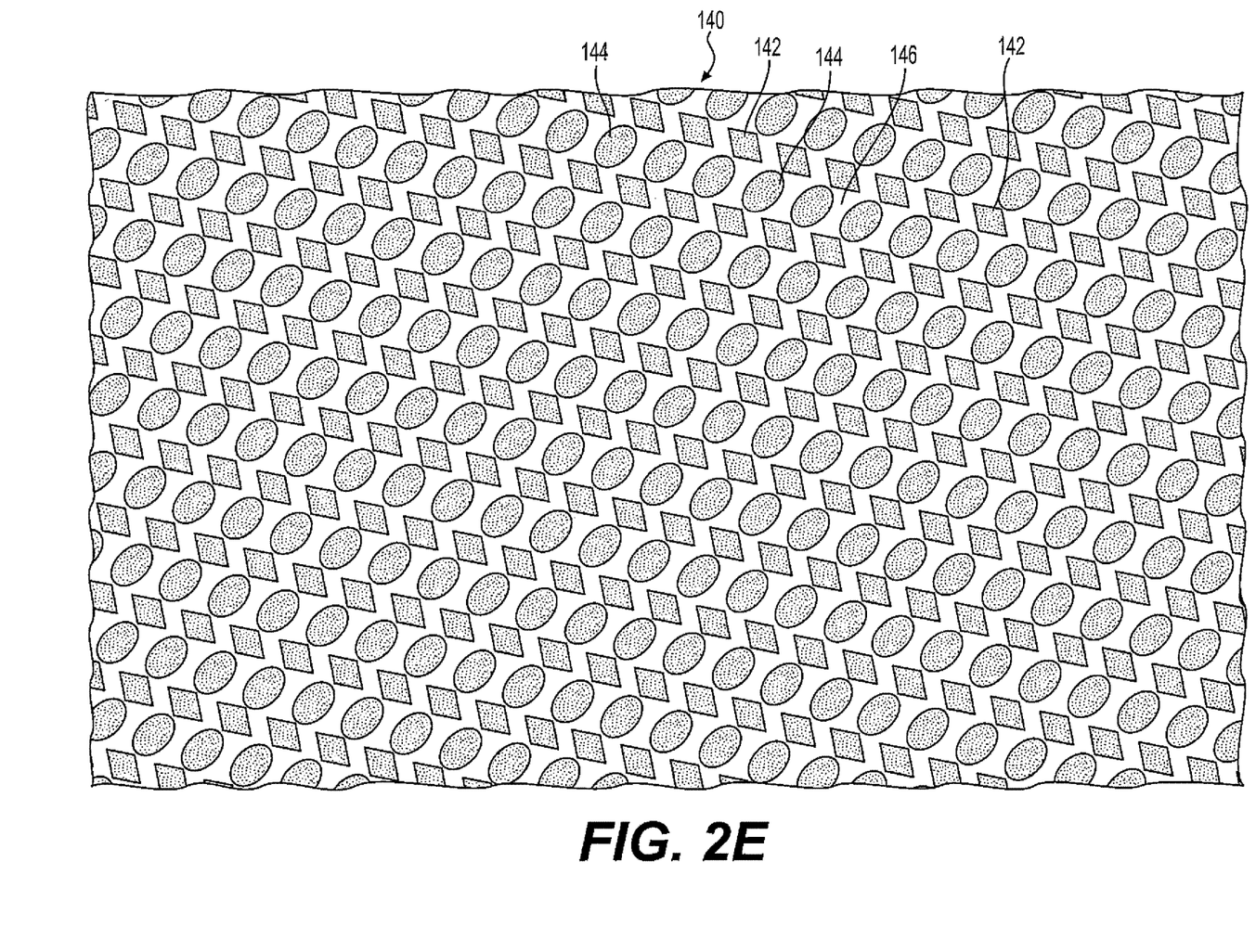

FIG. 2E illustrates the top view of the outside face of housewrap 140 having diamond-shaped half-bubbles 142 and oval half-bubbles 144. There are adjacent and alternating rows of the diamond half-bubbles 142 and oval half-bubbles 144. Embossed in between the half-bubbles 142 and 144 are flat portion channels 146. As shown, the long axis of the diamond half-bubbles 142 is perpendicular to the long axis of the oval half-bubbles 144 and are approximately 45 degrees from the vertical.

The examples of housewrap 20, 30, 40, 130 and 140 shown in FIGS. 2A-E respectively are merely examples of the embossing that may be pressed into the housewrap. It is alternatively possible that the embossed half-bubbles may be other shapes such as square, rectangular, triangular round or other shapes both symmetrical and asymmetrical as long as the purpose of forming and supporting channels between the embossing is achieved. Also, the size and relative orientation of the respective half-bubbles on a housewrap may be varied. Both symmetric and asymmetric patterns are possible.

Figure 3:
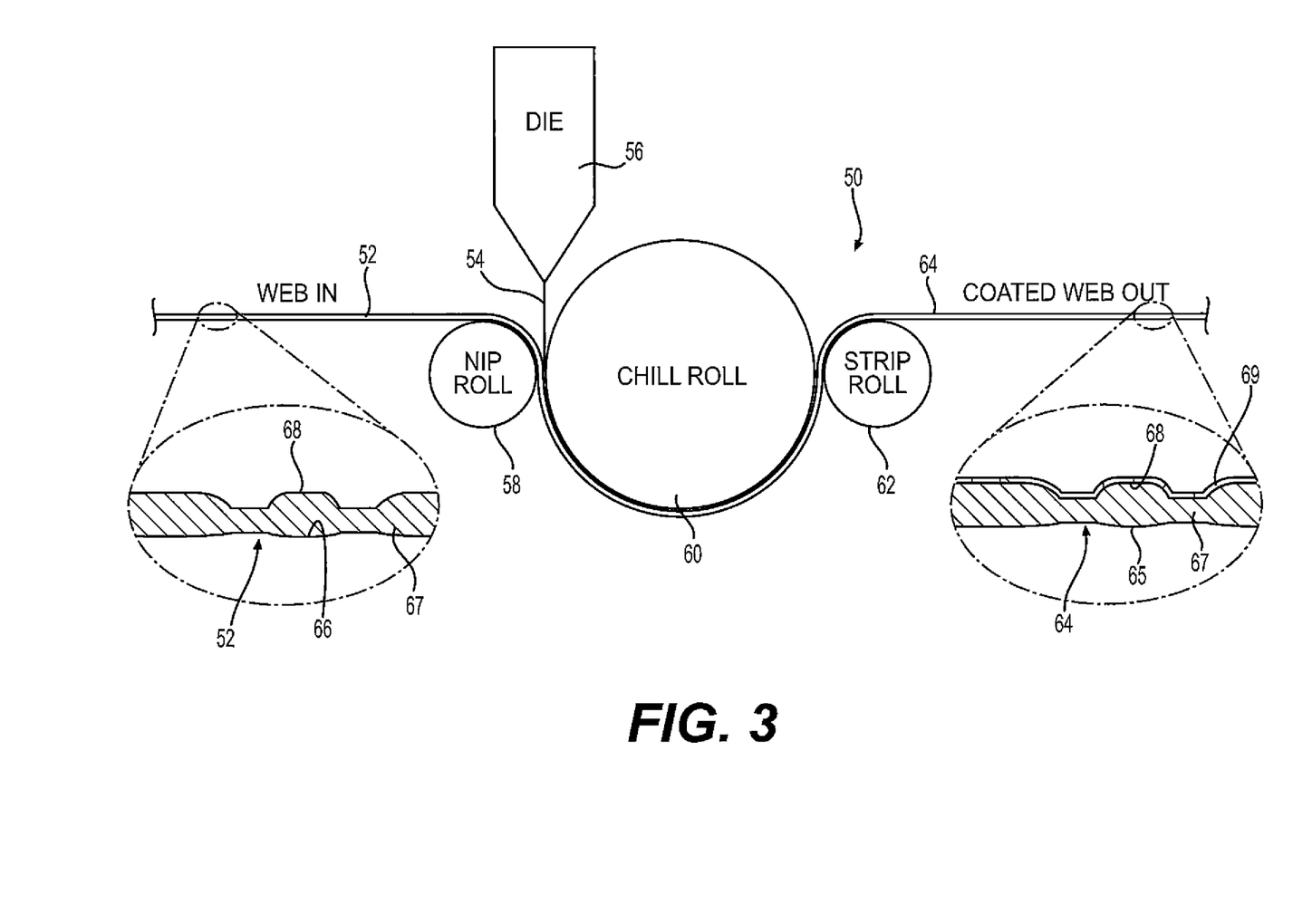
FIG. 3 is a schematic view of the process of coating the polymer on the base web of material.

FIG. 3 is a schematic view of the process 50 of coating an embossed web 52 with a polymer 54 to create a coated web 64. An uncoated, nonwoven web 52 is provided that has already been embossed. The web 52 is a nonwoven polymer 67 with a flat side 66 and the embossed side 68 to create a textured side of the web. The uncoated web 52 is passed between a nip roller 58 and a chill roll 60 while simultaneously being extrusion coated with a polymer 54 from an extrusion die 56. The heated liquid polymer 54 is cooled by the chill roll 60 thereby bonding it to the textured side 68 of the nonwoven web 52. A strip roll 62 is used to remove the coated web 64 from the chill roll 60. The result is the coated web 64 with a coating 69 on the textured side 68 of the nonwoven web 67. A side-effect of the process is the texturing of the uncoated side 65 of the coated web.

Figure 4:
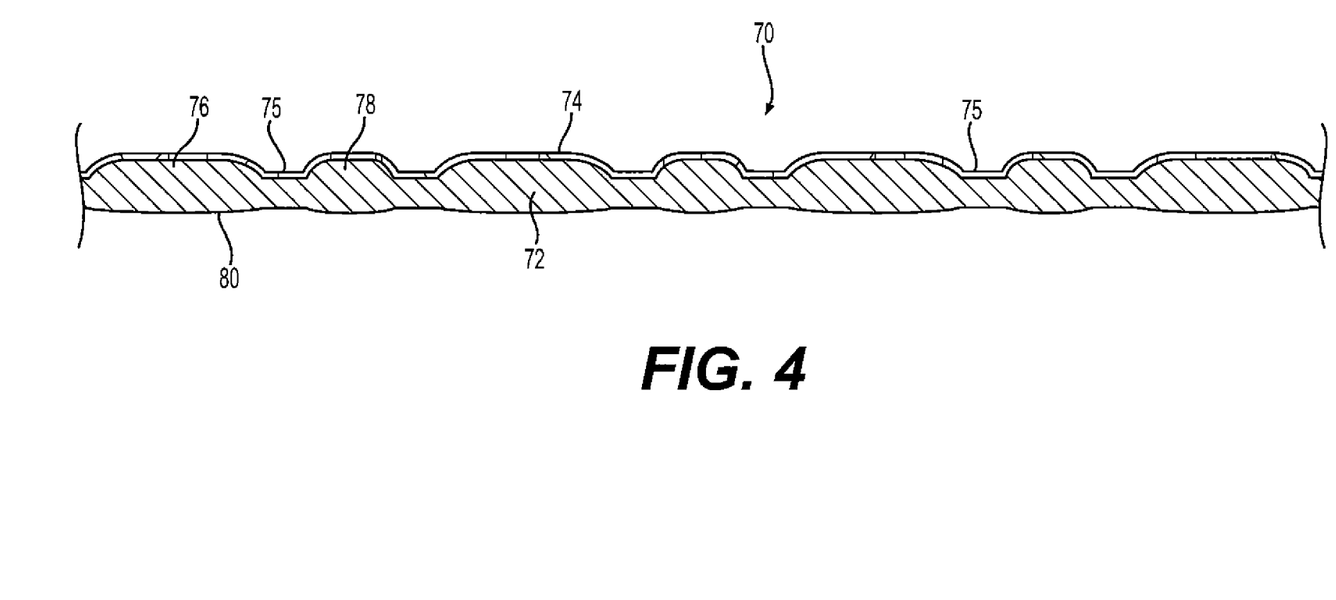
FIG. 4 is a side, cross-sectional view of the housewrap film after coating and activation.

FIG. 4 is a side, cross-sectional view of the coated web 70 having the oval half-bubbles as shown in FIG. 2A that alternate at perpendicular rows with long axis half-bubbles 76 and the width cross-section of similar half-bubbles 78. As shown, channels 75 are shown as the flat, unembossed portion of the web 70. The back, uncoated side 80 of the web 70 is shown having some limited amount of texture. The back side 80 is not flat, but it does not have the height of texture of the coated side 74. In production, the back side 80 has a texture height of about 25-75%, in one example about 50% of the coated, embossed side 74 of the web 70.

Figure 5:
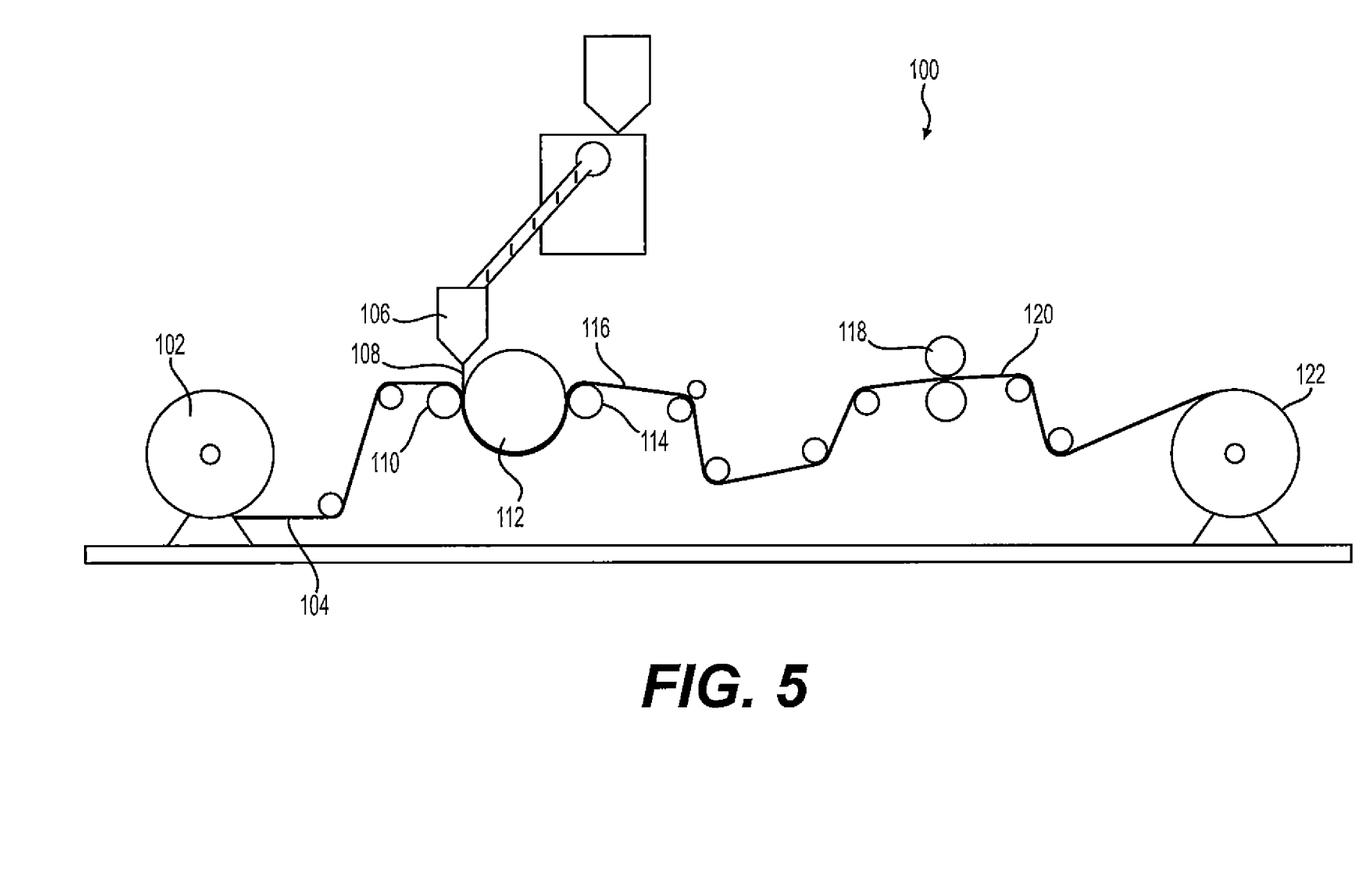
FIG. 5 is a schematic view of the complete process of coating and activating the housewrap film.

FIG. 5 is a schematic of the entire process 100 of coating and activating a web. Moving from left to right in FIG. 5, the process begins with a roll 102 of embossed, nonwoven film 104. The film 104 is unwound and fed between a nip roll 110 and chill roll 112 while an extrusion die 106 extrudes a polymer coating 108 onto the web 104. The now-coated web 116 feeds around a strip roll 114 to an activator 118 that stretches the coated film. The activated and coated web 120 is then wound up on rewind roller 122.

Figure 6:
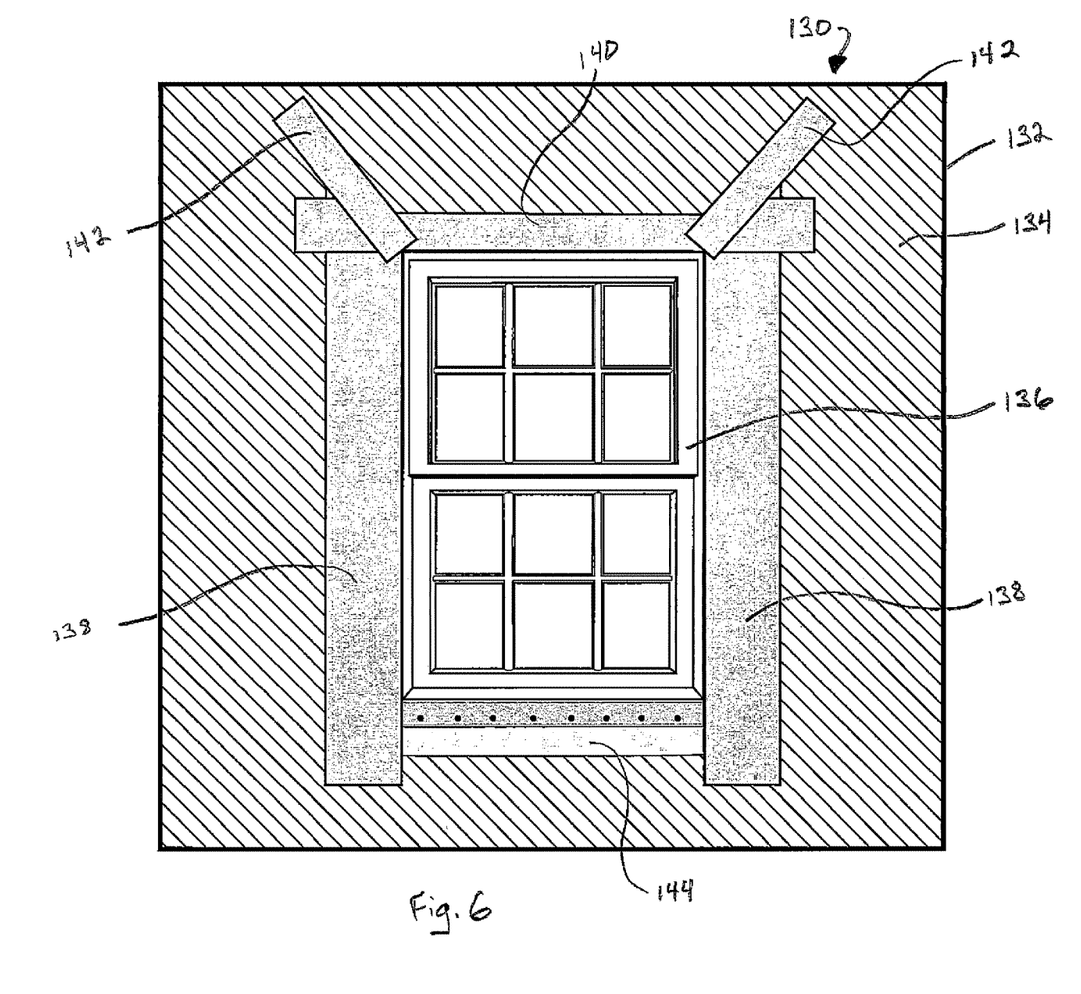
FIG. 6 is a front view of an example of a building window that has housewrap mounted around it and flashing tape applied around the window.

FIG. 6 is a side view of a portion of a building 130 having a sidewall 132 covered with the housewrap 134 described herein. As shown, the housewrap 134 is mounted all around a window 136 in the sidewall 132. In order to completely seal around the window 136, flashing tape 138, 140, 142 and 144 is adhered to the top surface of the housewrap 134 and to the sides, top and bottom of the window respectively. The use of flashing is required by local building codes and is a common construction technique in any event.

Figure 7:
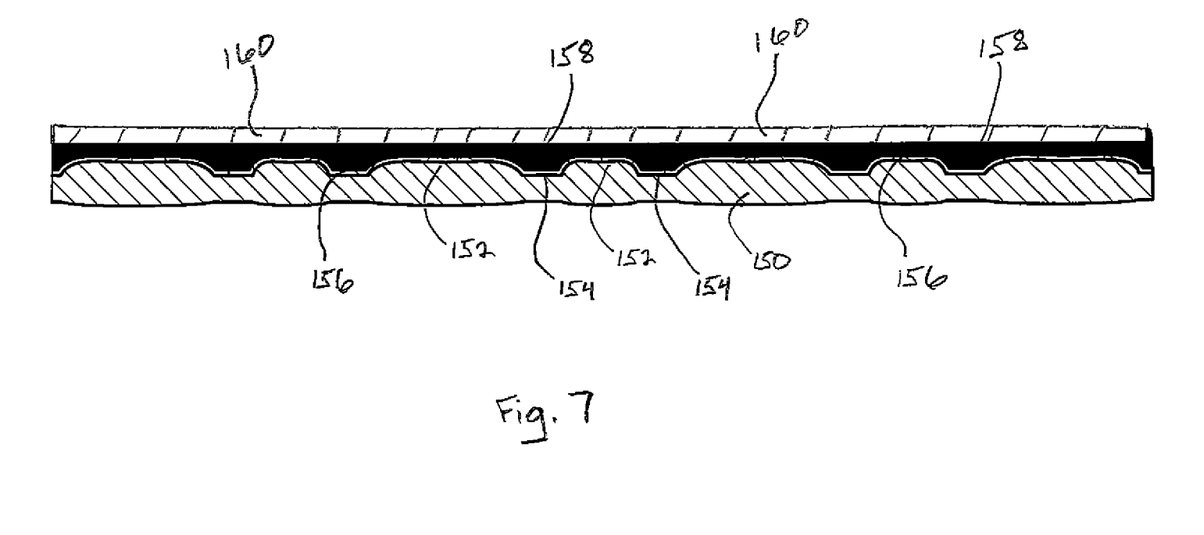
FIG. 7 is a side, cross-sectional view illustrating the seal created by the installation of a flashing tape onto the housewrap.

FIG. 7 illustrates the benefit of using a resilient housewrap 150 as described herein with a flashing tape 160. Specifically, during the installation process, a flashing tape 160 coated with adhesive 158 is pressed against the coated surface 156 of the housewrap substrate 150. With this pressure application, the adhesive 158 will adhere to and fill in next to the coated surface 156. Importantly, the housewrap substrate 150 is flexible so that it can flatten out under pressure in order to obtain an adhesive seal against both the textured bumps 152 and channels 154 on the surface of the housewrap 150. The result is a continuous seal between the adhesive 158 and the coated surface 156. No gaps or crevices allow water to pass or leak by this connection.

Example

An embossed web of nonwoven polypropylene fabric of about 100 gm/m2 basis weight and about 0.030" thickness is obtained and extrusion coated on the embossed side with 34 gm/m2 of a mineral/polymer blend (52% calcium carbonate, 42% low density polyethylene OR polypropylene, 6% additives for UV resistance, and processing aids) at a melt temperature of 540 deg F. with a matte finish. The coated fabric is then activated by intermeshing gears (IMG) to provide nonlinear microstretching in the cross-machine direction. The activated web is then printed, dried, and wound into 100-ft rolls. Finished product is tested to assure compliance to desired specifications, per:

ASTM E2273→90% drainage efficiency
ASTM E96→5 US Perms water vapor transmission rate
AATCC 127→55 cm hydrostatic head water pressure resistance
ASTM D882→40 lbs/inch tensile breaking strength
ASTM E2178←0.02 liters/sec air permeance The foregoing performance tests indicate a superior housewrap construction.

Other embodiments of the present invention will be apparent to those skilled in the art from consideration of the specification. It is intended that the specification and figures be considered as exemplary only, with a true scope and spirit of the invention being indicated by the following claims.

That which is claimed is:

1. A method of forming a drainage housewrap comprising the steps of:
    providing a base web formed of nonwoven spunbonded polymer fibers having a thickness before processing of 0.0025-0.03 inches;
    embossing a half-bubble pattern in the base web by passing the base web through heated nip rollers, wherein one of the nip rollers is flat and the other nip roller has a textured pattern thereon to create half-bubbles on the embossed surface of the embossed base web and thereby forming channels between the half-bubbles;
    applying a coating onto the embossed surface of the embossed base web by extrusion coating through a nip roller to the base web and then quenching the now-coated web, wherein the coating is a mixture of polymer and inorganic particles; and
    activating the coated and embossed base web by stretching to create micropores across and through the coating layer.

2. A method of forming a drainage housewrap as described in claim 1,
    wherein the three-dimensional pattern pressed into the base web creates two sets of channels that are substantially perpendicular from each other.

3. A method of forming a drainage housewrap as described in claim 1,
    wherein the three-dimensional pattern is in the shape of oval half-bubbles.

4. A method of forming a drainage housewrap as described in claim 3,
    wherein the oval half-bubbles are positioned in alternating rows such that a long axis of each row of oval half-bubbles is perpendicular to the long axis of each adjacent row of oval half-bubbles.

5. A method of forming a drainage housewrap as described in claim 1,
    wherein the inorganic particles in the coating comprise calcium carbonate.

6. A method of forming a drainage housewrap as described in claim 1,
    wherein the thickness of the coated base web is from 0.015 to 0.05 inches.

7. A method of forming a drainage housewrap as described in claim 1,
    wherein the polymer portion of the coating comprises polyethylene.

8. A method of forming a drainage housewrap as described in claim 1,
    wherein the polymer portion of the coating comprises polypropylene.

9. A method of forming a drainage housewrap as described in claim 5,
    wherein the calcium carbonate comprises 35-70% by weight of the coating.

* * * * *